W. SEARBY.
MANUFACTURE OF SUGAR.
APPLICATION FILED JUNE 29, 1914.
1,146,456.
Patented July 13, 1915.
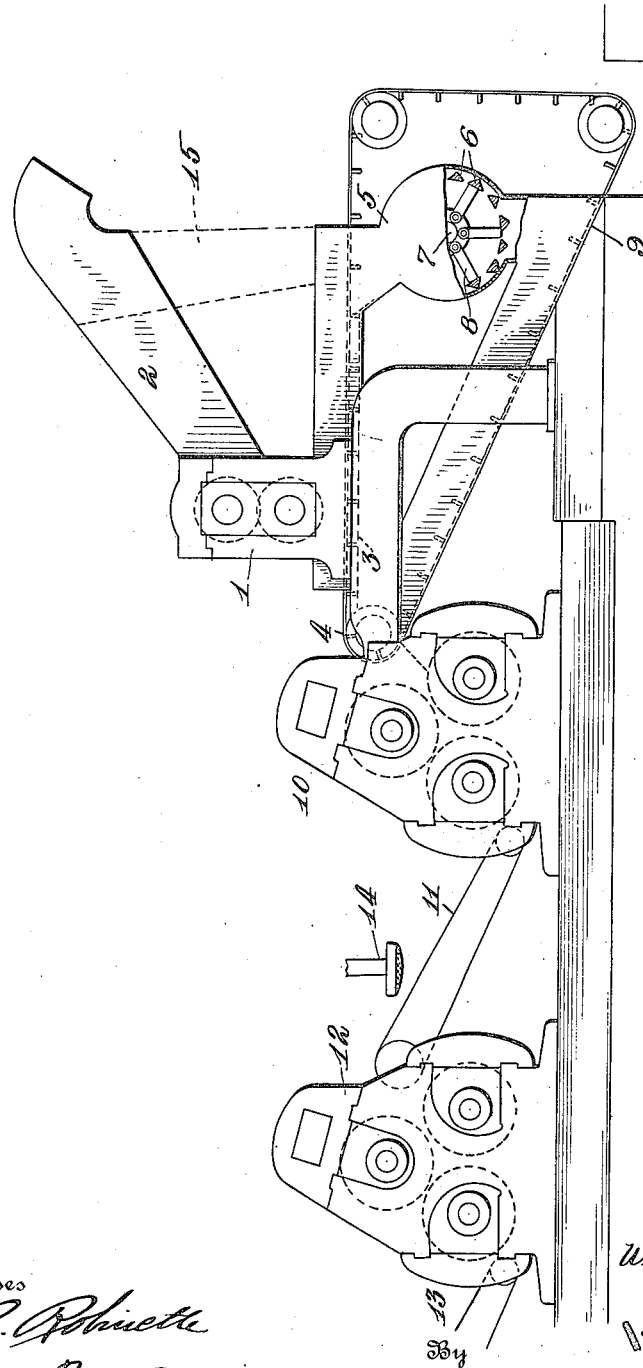

UNITED STATES PATENT OFFICE.

WILLIAM SEARBY, OF PUUNENE, TERRITORY OF HAWAII.

MANUFACTURE OF SUGAR.

1,146,456.              Specification of Letters Patent.       Patented July 13, 1915.

Application filed June 29, 1914. Serial No. 847,852.

*To all whom it may concern:*

Be it known that I, WILLIAM SEARBY, a citizen of the United States, residing at Puunene, in the county of Maui and Territory of Hawaii, have invented certain new and useful Improvements in the Manufacture of Sugar, of which the following is a specification.

This invention relates to the manufacture of sugar; and it comprises a method of securing high extraction of sugar juices from sugar cane, sorghum and like materials wherein the cane after having been submitted to a rolling expression to crush and flatten it and to express juice is subjected to a beating action to disintegrate it and separating the fibers relatively to each other to form a loose fibrous mass and the disaggregated material is thereafter once more subjected to rolling expression; and it also comprises as a new organization of apparatus elements a pressing and rolling member, a beating and fiber disintegrating member and a pressing roller member, said members being in series and adapted to successively treat cane fed thereto; all as more fully hereinafter set forth and as claimed.

Sugar cane, sorghum cane, etc., have a relatively tough and hard rind portion and a softer pithy central portion. In the rind the fibers are relatively long and in the pithy portion are shorter. In the expression of juice for the manufacture of sugar, the cane is passed through roller pressing apparatus, usually called "mills" in the art. After complete expression in these mills, the residual fibrous material or "bagasse" is used as fuel. It is found however that no matter what the pressure exerted by the mills only a certain amount of the juice can be extracted, the residue of the juice remaining in and moistening the fibrous material and going away with the bagasse. Whatever sugar is in the juice in the bagasse is of course lost. Therefore in current practice in the effort to reduce this source of loss it is usual to "macerate"; that is, to pass the cane through a succession of mills, spraying the cane coming from one mill with liquid before going to the next; the theory of the operation being that the sprayed liquid mixes with and dilutes the residual juice and a juice mixture in amount corresponding to the amount of liquid added can be pressed out enabling a better extraction. In practice, where four or five successive mills are used, as is often the case, the cane going to the last mill in the series is sprayed with water and the juice extracted is used for spraying the cane going to the next in series and so on. The juice from the first mill, which treats fresh cane, and from the second mill in the series, goes to the sugar house. As a matter of theory, by four or five treatments with spraying liquid in this manner residual sugar of the cane can be reduced to a negligible quantity, but as a matter of fact, however, the extraction is not as good as can be desired; even where large amounts of maceration water are used. The difficulty arises from the fact that mixture of sprayed liquid and residual juice is not instantaneous. In the effort to get better extraction occasionally rather large amounts of water are employed. But there is a practical limit to the amount which can be so used since the added water must all be evaporated off again in the final concentration of the juice to make sugar. In the addition of water, the point is soon reached where the cost of evaporation is greater than the value of the additional sugar which is recovered.

The juice of the cane is contained in the interior of cellular elements not all of which can be ruptured by pressing; and as a matter of fact in the ordinary rolling operation many of the liquid containing vessels of the cane are merely squeezed somewhat without being actually freed of all their liquid content. Some little juice probably remains in the cane over and above the amount of juice remaining as irremovable moistening liquid. Furthermore the rolling merely flattens and compresses the cane with no great amount of lateral separation of the fibers, the fibers clinging together more or less throughout the operation, even where tearing or shredding rolls are used. In moistening such a flattened assemblage of fibers, the dilution of juice contained in the interior of a non-ruptured cell or inclosed in the interior of a given mass must depend upon a lateral diffusion of water through the cellular elements; which is not a rapid action. The cane fibers structurally are adapted to permit lengthwise movement of fluids but not lateral; and lateral penetration must be by diffusion. Shredding and tearing rollers are frequently used for the first mill in a series; and while these break up the cane, they fail to give a good lateral separation of fiber from fiber.

I have found that I can produce a better extraction with less added water by intercalating a fiber-loosening step between the rolling operations. By disaggregating the fibers and converting the cane into a loose fibrous mass, I at once raise the extraction and lessen the amount of water to be evaporated as compared with the ordinary maceration process. Advantageously, the fiber-loosening is immediately after the first expressing and crushing operation; but a less degree of the same advantages may be secured by using it after the second rolling or even after a later operation. While the fibers may be loosened in other ways, I find a suitable beating operation may be used to secure a lateral separation between the several fibers of a fiber bundle or tissue without shortening or breaking the fibers unduly. The longer the fibers, the better is the feed through the mills. If the disintegration were an ordinary comminution by transverse cutting, the material would not enter the "bite" of an ordinary mill. But with fibrous material retaining relatively long thin fibers feed is easy.

Advantageously I first run the cane through a toothed or serrated rolling and crushing device which converts it into flat ribbon-like pieces or lengths. In this preliminary pressing and crushing operation I obtain of course a large proportion of the juice. The pressed material I next beat in any suitable mechanism to produce a lateral separation of the fibers. A convenient and advantageous type of mechanism is a series of pivoted hammers rotating in a cage-like construction of longitudinal anvil bars spaced apart. The fibers as quickly as disintegrated pass out between the anvil bars and the fibrous material is next given a rolling pressure as by sending it through an ordinary 3-roller cane mill. In practice, I ordinarily pass it successively through three to five such mills, moistening the material as usual as the expanding cane leaves one mill to pass to the next. Before passing through the third mill it may be moistened with dilute juice from the fourth mill, etc., in the usual manner. The fibers having been more or less laterally separated feed in and through the ordinary mill very readily. In the beating operation the rind fibers are usually left one to twelve inches in length. The pithy fibers are somewhat shorter. The rind fibers are long enough to enter the bite of a mill and feed freely therethrough. The pithy fiber is carried along by the rind fiber.

In the moistening or spraying, the liquid does not have to pass laterally through groups or bundles of fiber but gains direct access to the several fibers, rendering mixture and dilution rapid and effectual.

In the accompanying illustration I have shown, more or less diagrammatically, partly in elevation and partly in vertical section, one form of apparatus useful in the described process and within the scope of my invention.

In this showing, element 1 is an ordinary type of mill (shown as a two roller device) which may be a crushing and tearing or shredding mill if desired. Cane is fed to it through conduit 2. The cane in a crushed and flattened state passes through the mill and drops on table 3 along which it is carried by conveyer 4 to a beating or fiber forming device indicated as a whole by 5. In this beating device angle anvil bars 6, spaced somewhat apart, form a sort of open cage or grating. Rotating member 7 carrying pivoted beater arms 8 coöperates with these angle bars to disintegrate the cane. The fibrous material drops through the spaces between the bars and is carried up along table 9 by the conveyer and delivered to an ordinary type of 3-roller mill indicated as a whole by 10. Passing through 10 the fibrous material is given a further expression. From this mill the cane is taken by conveyer 11 to another 3-roll mill indicated as a whole by 12. From this mill it is taken by conveyer 13 to another mill (not shown). There may be as many of these mills in series as may be desired. In passing between the mills, the pressed material is sprayed with maceration liquid through spraying device 14. Element 1 may be a mill like that shown as 10. If it should be desired to send the cane to the beating device prior to compression, this is practicable by means of an alternative chute 15 shown in dotted lines. But I regard it as better to roll and crush the cane prior to beating it.

For purposes of exposition of the invention, I have described and shown a particular type of beater, but the lateral separation of the fibers may be accomplished in any suitable mechanism combined with the usual mill in such manner that the cane is disintegrated into a fibrous mass either after a preliminary flattening or compression, or before such flattening or compression, and at some stage in the process prior to its subjection to a maceration treatment.

What I claim is:—

1. The process of recovering sugar from cane which comprises crushing cane to flatten and break it, loosening the fibers to convert such cane into a loose fibrous mass, and re-pressing the fibrous material.

2. The process of recovering sugar from cane which comprises crushing cane to flatten and break it, loosening the fibers to convert such cane into a loose fibrous mass, and re-pressing the fibrous material a plurality of times, and spraying the mass between re-pressing operations.

3. The process of recovering sugar from cane which comprises submitting cane to rolling pressure a plurality of times, and loosening the fiber to convert such cane into a loose fibrous mass between a pair of such pressing operations.

4. The process of recovering sugar from cane which comprises crushing cane to flatten and break it, submitting the crushed cane to a beating operation to loosen the fibers and re-pressing the fibrous material.

5. In the recovery of sugar from cane, the process which comprises submitting cane to a beating operation to loosen the fibers and convert such cane into a loose fibrous mass and thereafter submitting such fibrous mass to a pressing operation.

6. In the recovery of sugar from cane, the process which comprises submitting cane to a beating operation to loosen the fibers and convert such cane into a loose fibrous mass and thereafter submitting such fibrous mass to pressing operations a plurality of times.

7. In cane treating apparatus, a beating and fibrous mass forming device and a plurality of roller pressing devices arranged in series for successive treatment of cane.

8. In cane treating apparatus, a roller pressing device, a beating and fibrous mass forming device and a roller pressing device arranged in series for successive treatment of the cane.

In testimony whereof, I affix my signature in the presence of two subscribing witnesses.

WILLIAM SEARBY.

Witnesses:
D. C. LINDSAY,
H. K. DUNCAN.